(12) United States Patent
Tang et al.

(10) Patent No.: US 11,610,330 B2
(45) Date of Patent: Mar. 21, 2023

(54) METHOD AND APPARATUS WITH POSE TRACKING

(71) Applicant: SAMSUNG ELECTRONICS CO., LTD., Suwon-si (KR)

(72) Inventors: Chuangqi Tang, Xi'an (CN); Yuguang Li, Xi'an (CN); Zhuo Li, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/063,909

(22) Filed: Oct. 6, 2020

(65) Prior Publication Data

US 2021/0104062 A1 Apr. 8, 2021

(30) Foreign Application Priority Data

Oct. 8, 2019 (CN) .......................... 201910950626.1
Sep. 8, 2020 (KR) .......................... 10-2020-0114552

(51) Int. Cl.
*G06T 7/73* (2017.01)
*G06T 7/246* (2017.01)

(52) U.S. Cl.
CPC ................ *G06T 7/73* (2017.01); *G06T 7/246* (2017.01); *G06T 2207/30196* (2013.01); *G06T 2207/30204* (2013.01)

(58) Field of Classification Search
CPC ........... G06T 7/20; G06T 7/246; G06T 7/248; G06T 7/30; G06T 7/33; G06T 7/337; G06T 7/70; G06T 7/73; G06T 7/74; G06T 2207/30204; G06T 2207/30208; G06V 20/647
See application file for complete search history.

(56) References Cited

U.S. PATENT DOCUMENTS

| | | | |
|---|---|---|---|
| 10,260,862 B2 | 4/2019 | Ramalingam et al. | |
| 2008/0170750 A1* | 7/2008 | Gordon | .................. G06T 7/246 382/103 |
| 2016/0247293 A1 | 8/2016 | Beylin et al. | ......... G06T 7/2086 |

(Continued)

FOREIGN PATENT DOCUMENTS

| | | | | |
|---|---|---|---|---|
| CN | 103607541 A | 2/2014 | ............. | H04N 5/232 |
| CN | 103930944 A | 7/2014 | ............... | G09G 5/00 |

(Continued)

OTHER PUBLICATIONS

Steinbring, Jannik, et al. "Real-time Whole-body Human Motion Tracking based on Uniabeled Markers." *2016 IEEE International Conference on Multisensor Fusion and Integration for Intelligent Systems (MFI)*. IEEE, 2016. (8 pages in English).

(Continued)

*Primary Examiner* — Andrew W Johns
(74) *Attorney, Agent, or Firm* — NSIP Law

(57) ABSTRACT

A pose tracking method and apparatus are disclosed. The pose tracking method includes obtaining an image of a trackable target having a plurality of markers, detecting first points in the obtained image to which the markers are projected, matching the first points and second points corresponding to positions of the markers in a coordinate system set based on the trackable target based on rotation information of the trackable target, and estimating a pose of the trackable target based on matching pairs of the first points and the second points.

20 Claims, 7 Drawing Sheets

(56) References Cited

U.S. PATENT DOCUMENTS

| | | | |
|---|---|---|---|
| 2017/0124693 A1 | 5/2017 | Ramalingam et al. | |
| 2018/0308240 A1 | 10/2018 | Comport et al. | G06T 7/248 |
| 2018/0350101 A1* | 12/2018 | Glover et al. | G06T 7/55 |
| 2019/0096068 A1 | 3/2019 | Fontanel et al. | |

FOREIGN PATENT DOCUMENTS

| | | | |
|---|---|---|---|
| CN | 104769454 A | 7/2015 | G01S 7/497 |
| CN | 105844659 A | 8/2016 | G06T 7/20 |
| CN | 106068533 A | 11/2016 | G09G 3/36 |
| CN | 108074262 A | 5/2018 | G06T 7/73 |
| CN | 108596980 A | 9/2018 | G06T 7/80 |
| CN | 108648215 A | 10/2018 | G06T 7/246 |
| CN | 109298629 A | 2/2019 | G05B 9/03 |
| CN | 109474817 A | 3/2019 | H04N 13/207 |
| CN | 110036258 A | 7/2019 | G01B 11/24 |
| CN | 110120099 A | 8/2019 | G06T 19/00 |
| WO | WO 2019/066476 A1 | 4/2019 | G06T 7/70 |

OTHER PUBLICATIONS

Censi, Andrea, et al. "Low-latency Localization by Active LED Markers Tracking using a Dynamic Vision Sensor." *2013 IEEE/RSJ International Conference on Intelligent Robots and Systems*. IEEE, 2013. (8 pages in English).

Chinese Office dated Jan. 6, 2022 in corresponding Chinese Application No. 201910950626.1 (12 pages in English and 9 pages in Chinese).

Chinese Office Action dated Aug. 22, 2022, in counterpart Chinese Patent Application No. 201910950626.1 (9 pages in English and 8 pages in Chinese).

\* cited by examiner

METHOD AND APPARATUS WITH POSE TRACKING

CROSS-REFERENCE TO RELATED APPLICATIONS

This application claims the benefit under 35 USC § 119(a) of Chinese Patent Application No. 201910950626.1 filed on Oct. 8, 2019, in the China National Intellectual Property Administration, and Korean Patent Application No. 10-2020-0114552 filed on Sep. 8, 2020, in the Korean Intellectual Property Office, the entire disclosures of which are incorporated herein by reference for all purposes.

BACKGROUND

1. Field

The following description relates to a method and apparatus with pose tracking.

2. Description of Related Art

Six degrees of freedom (6-DOF) pose tracking method is widely used in various technical fields including, for example, robotic grasping, virtual reality (VR) and augmented reality (AR), and human-computer interaction technologies.

When implementing VR and AR, there is a high requirement for a system delay. For example, when a system responds to a movement of a user relatively slowly, the user may feel dizzy or nauseous. A typical commercialized VR tracking technology has a minimum delay time of 15 milliseconds (ms), which may not provide a user with a completely immersive experience.

There are currently numerous optical tracking systems that are based on a complementary metal-oxide-semiconductor (CMOS) camera. The COMS camera may have a delay greater than 16.7ms, or 60 frames per second (FPS), in general, and thus may not satisfy a low delay requirement for VR.

To track a 6-DOF pose of an object, a light-emitting diode (LED) marker may be used. However, when using the LED marker, a layout of an LED lamp or whether it is detected may greatly affect the accuracy in pose tracking and the robustness of a system. In addition, it may take a great amount of time to solve a corresponding translational relationship between an LED marker in a three-dimensional (3D) space and a pixel in a two-dimensional (2D) image to which the LED marker is projected, which may affect a realtime system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a pose tracking method includes obtaining an image of a trackable target having a plurality of markers, detecting first points in the obtained image to which the markers are projected, matching the first points to second points corresponding to positions of the markers in a coordinate system that is set based on the trackable target based on rotation information of the trackable target, and estimating a pose of the trackable target based on matching pairs of the first points and the second points.

The obtaining may include obtaining only information of pixels in the image that periodically change.

The detecting may include obtaining pixels in the image that periodically changeby filtering based on a characteristic of the change, classifying the obtained pixels into different clusters based on respective positions of the pixels, and detecting, as the first points, pixels at positions having greatest densities in the clusters.

The matching may include establishing a translation vector based on one or more functions of coordinates of the first points, coordinates of the second points, and the rotation information, obtaining a translation vector list including solutions of the one or more functions, and matching the first points and the second points based on the obtained translation vector list.

The matching based on the translation vector list may include determining validity of translation vectors included in the translation vector list, and matching the first points and the second points based on a result of the determining of the validity of the translation vectors.

The determining of the validity may include determining whether at least one of elements of the translation vector exceeds a threshold value, and determining whether an element of the translation vector is a negative value.

The matching may include detecting, among the markers, a visible marker observable by a camera capturing the image, and matching the first points and the second points based on the detected visible marker.

The pose tracking method may further include discarding a matching pair, among the matching pairs, of which a reprojection deviation exceeds a preset threshold value, and updating the matching pairs based on a newly observed marker in the image.

The estimating may include fusing the pose estimated, based on the matching pairs, and the rotation information.

In another general aspect, a pose tracking apparatus includes a memory including instructions, and a processor configured to execute the instructions. When the instructions are executed by the processor, the processor may obtain an image of a trackable target having a plurality of markers, detect first points in the obtained image to which the markers are projected, match the first points to second points corresponding to positions of the markers in a coordinate system that is set based on the trackable target based on rotation information of the trackable target, and estimate a pose of the trackable target based on matching pairs of the first points and the second points.

The processor may obtain only information of pixels in the image that periodically change.

The processor may obtain pixels in the image that periodically change by filtering based on a characteristic of the change, classify the obtained pixels into different clusters based on positions of the pixels, and detect, as the first points, pixels at positions having greatest densities in the clusters.

The processor may establish a translation vector based on one or more functions of coordinates of the first points, coordinates of the second points, and the rotation information, obtain a translation vector list including solutions of the one or more functions, and match the first points and the second points based on the obtained translation vector list.

The processor may determine validity of translation vectors included in the translation vector list, and match the first points and the second points based on a result of the determining of the validity of the translation vectors.

The processor may determine whether at least one of elements of the translation vector exceeds a threshold value, and determine whether an element of the translation vector is a negative value.

The processor may detect, among the markers, a visible marker observable by a camera capturing the image, and match the first points and the second points based on the detected visible marker.

The processor may discard a matching pair, among the matching pairs, of which a reprojection deviation exceeds a preset threshold value, and update the matching pairs based on a newly observed marker in the image.

The processor may fuse the pose estimated based on the matching pairs, and the rotation information.

The pose tracking apparatus may further include an image capturing device configured to capture the image, and an inertial measurement unit (IMU) configured to detect the rotation information.

Other features and aspects will be apparent from the following detailed description, the drawings, and the claims.

Figure 1:
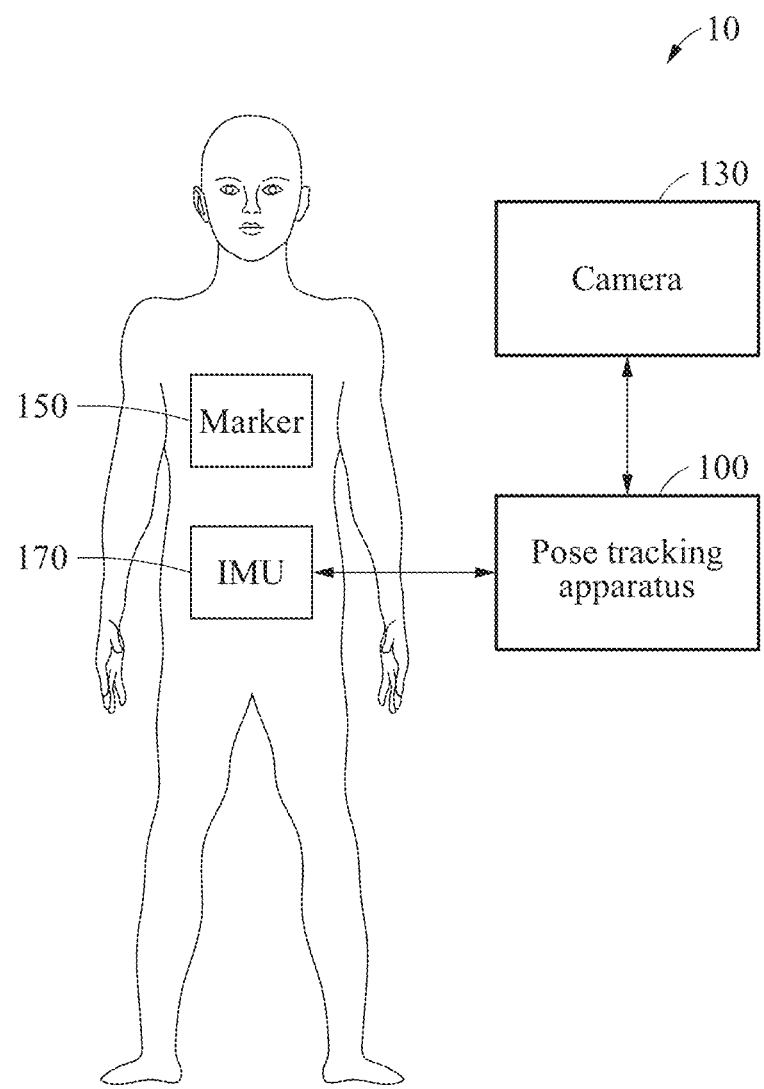
FIG. 1 illustrates an example of a pose tracking system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a pose tracking system.

A pose tracking system 10 may track a pose of a target of which a pose is to be tracked. The target of which a pose is to be tracked will be hereinafter referred to as a trackable target. The pose tracking system 10 may track a pose of a trackable target having six degrees of freedom (6-DOF).

6-DOF may include three degrees of freedom (3-DOF) associated with a translational motion of a rigid body in a three-dimensional (3D) space, and 3-DOF associated with the rotational motion of the rigid body in the 3D space. That is, the pose tracking system 10 may track a change in position based on a translational motion of an object in a 3D space and a change in orientation based on the rotational motion of the object in the 3D space.

In FIG. 1, for example, the pose tracking system 10 includes a pose tracking apparatus 100, a camera 130, a marker 150, and an inertial measurement unit (IMU) 170.

The pose tracking apparatus 100 may track a pose of a trackable target based on an image of the trackable target captured by the camera 130 and measurement data of the IMU 170 attached to the trackable target.

The camera 130 may transmit, to the pose tracking apparatus 100, the image obtained by capturing the image of the trackable target. Although the camera 130 is illustrated in FIG. 1 as being separate from the pose tracking apparatus 100, examples are not limited to the illustrated example. For example, the camera 130 may be included in the pose tracking apparatus 100.

The camera 130 may be a dynamic vision sensor (DVS) camera, including a DVS. For example, the camera 130 may detect a local change in an image being captured through the DVS and obtain pixel information associated with a pixel that changes based on time. The camera 130 may transmit, to the pose tracking apparatus 100, only pixel information of a pixel that changes based on time, thereby preventing a delay that may occur in the process of data transmission and/or processing.

The marker 150 may be attached to the trackable target. The number of markers to be attached and respective positions to which the markers are attached may be suitably adjusted based on the size and/or shape of the trackable target.

The marker 150 may be a light-emitting diode (LED) lamp that blinks periodically. A blinking or periodically blinking marker 150 may be detected through the DVS of the camera 130. The camera 130 may detect a pixel of which brightness changes and transmit corresponding information of the pixel to the pose tracking apparatus 100. The pose tracking apparatus 100 may then detect a pixel corresponding to the marker 150 based on a period of such a change in brightness. Although the marker 150 is described herein as a blinking LED lamp, the marker 150 is not limited thereto. For example, various types of visual markers that may be visually detected through the camera 130 may be used.

The IMU 170 may be attached to the trackable target. The IMU 170 may measure linear acceleration and a rotation speed of the trackable target to which the IMU 170 is attached, using an accelerometer and/or a rotation speedometer. The IMU 170 may detect a motion of the trackable target and transmit measurement data to the pose tracking apparatus 100. The measurement data may include rotation information of the trackable target.

The pose tracking apparatus 100 may detect the rotation information of the trackable target based on the measurement data of the IMU 170. For example, the pose tracking apparatus 100 may detect pitch, roll, and yaw that correspond to 3-DOF of a rotational motion based on the measurement data of the IMU 170.

The pose tracking apparatus 100 may estimate a pose of the trackable target by matching the marker 150 and a point to which the marker 150 is projected in the image captured through the camera 130.

For example, the pose tracking apparatus 100 may match a pixel, to which each marker is projected in the image, to a corresponding marker using the measurement data obtained from the IMU 170. That is, the pose tracking apparatus 100 may match the marker 150 and the point to which the marker 150 is projected in the image using the rotation information of the trackable target that is detected based on the measurement data, thereby reducing the dependency of pose tracking on a layout of the marker 150 and improving accuracy and efficiency in pose tracking.

Figure 2:
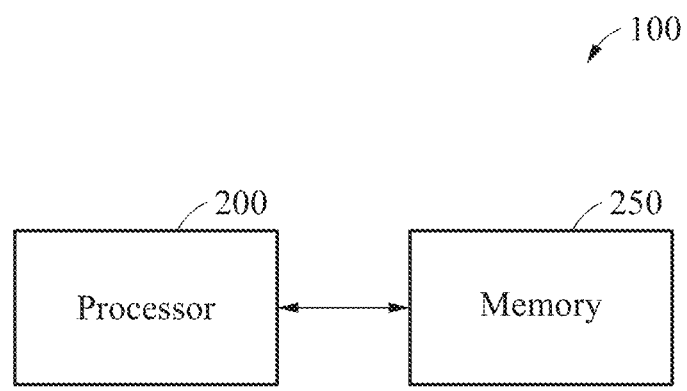
FIG. 2 illustrates an example of a pose tracking apparatus shown in FIG. 1.

FIG. 2 illustrates an example of the pose tracking apparatus 100, shown in FIG. 1.

Referring to FIG. 2, for example, the pose tracking apparatus 100 includes a processor 200 and a memory 250.

The processor 200 may execute a computer-readable code (e.g., software) stored in the memory 250 and instructions induced by the processor 200.

The processor 200 may be a data processing device embodied by hardware having a circuit of a physical structure to execute desired operations. The desired operations may include a code or instructions included in a program, for example. The data processing device embodied by hardware may include, for example, a microprocessor, a central processing unit (CPU), a processor core, a multicore processor, a multiprocessor, an application-specific integrated circuit (ASIC), and a field-programmable gate array (FPGA).

The memory 250 may store instructions (or a program) executable by the processor 200. For example, the instructions may include instructions to execute an operation of the processor 200 and/or an operation of each component of the processor 200.

The memory 250 may be embodied by a volatile or nonvolatile memory device. The volatile memory device may be embodied as, for example, a dynamic random-access memory (DRAM), a static RAM (SRAM), a thyristor RAM (T-RAM), a zero-capacitor RAM (Z-RAM), or a twin-transistor RAM (TTRAM). The nonvolatile memory device may be embodied as, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Hereinafter, a pose tracking method to be performed by the processor 200 of the pose tracking apparatus 100 will be described in detail with reference to FIGS. 3 through 7.

Figure 3:
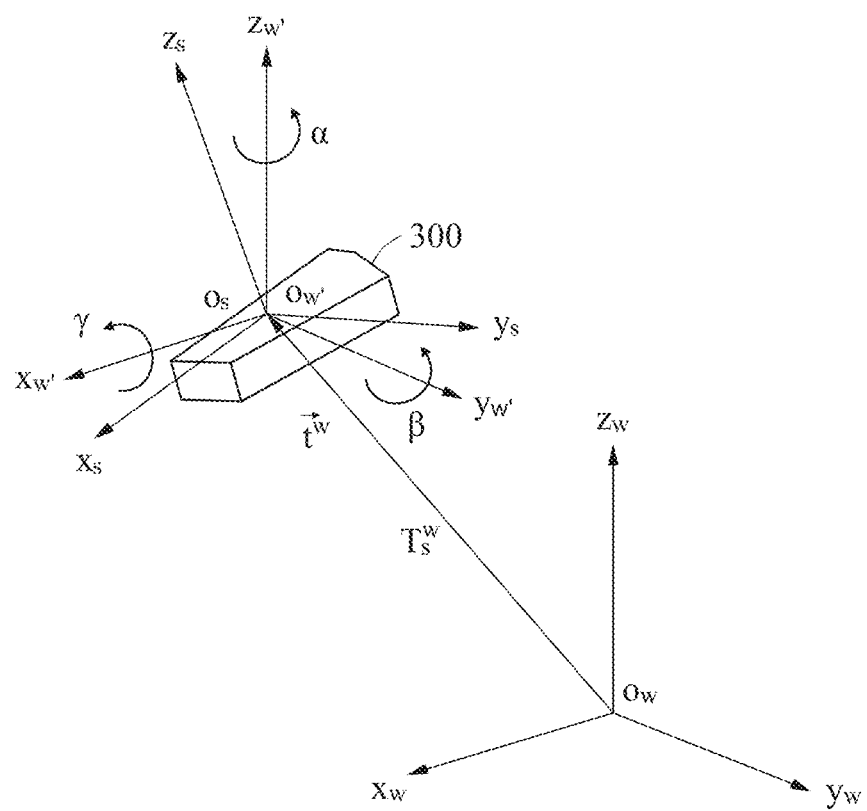
FIG. 3 illustrates an example of a coordinate system and a parameter used for an operation of the pose tracking apparatus shown in FIG. 1.

FIG. 3 illustrates an example of a coordinate system and a parameter used for an operation of the pose tracking apparatus 100 shown in FIG. 1.

In FIG. 3, a coordinate system Ow may be a reference coordinate system used to describe a motion of a trackable target 300. For example, the reference coordinate system Ow may be set based on a fixed camera 130.

A coordinate system Os may be a coordinate system that moves along with the trackable target 300 by being fixed to the trackable target 300. A coordinate system Ow' may be a coordinate system that maintains the same orientation as the reference coordinate system Ow and shares an origin point or a starting point with the coordinate system Os.

A position of the trackable target 300 may be a position in the coordinate system Os fixed to the trackable target 300 with respect to the reference coordinate system Ow. The position of the trackable target 300 may be represented as $\vec{t}^w=[t_x,t_y,t_z]^T$.

An orientation of the trackable target 300 may be an orientation in which the coordinate system Os fixed to the trackable target 300 is rotated with respect to the coordinate system Ow' that maintains the same orientation as the reference coordinate system Ow. The orientation of the trackable target 300 may be represented by yaw α, pitch β, and roll γ.

The processor 200 may track a 6-DOF pose of the trackable target 300 by calculating a position and an orientation of the coordinate system Os fixed to the trackable target 300 with respect to the reference coordinate system Ow. For example, the pose tracking apparatus 100 may calculate a matrix $T_s^w$ that indicates the position and the orientation at which the coordinate system Os moves with respect to the reference coordinate system Ow. The matrix $T_s^w$ may be defined as a position (tx, ty, tz) and an orientation (α, β, γ) of the trackable target 300, as represented by Equation 1 below.

$$T_s^w = \begin{bmatrix} c\alpha c\beta & c\alpha s\beta s\gamma - s\alpha c\gamma & c\alpha s\beta c\gamma + s\alpha s\gamma & t_x \\ s\alpha c\beta & s\alpha s\beta s\gamma + c\alpha c\gamma & s\alpha s\beta c\gamma - c\alpha s\gamma & t_y \\ -s\beta & c\beta s\gamma & c\beta c\gamma & t_z \\ 0 & 0 & 0 & 1 \end{bmatrix} \quad \text{Equation 1}$$

The pose tracking system 10 may include a camera coordinate system, a trackable target coordinate system, an IMU coordinate system, a world coordinate system (e.g., a coordinate system set based on a space in which the pose tracking system 10 is implemented), and the like. For example, in a case in which a trackable target is a human body, the trackable target may include a head, a torso, arms, and legs, and thus the pose tracking system 10 may include a coordinate system that is set based on each of the head, the torso, the arms, and the legs.

In a case in which a position of the camera 130 is fixed in the pose tracking system 10, relative positions and orientations may be set between the camera coordinate system and the world coordinate system, and thus a transformation matrix between the camera coordinate system and the world coordinate system may be constant and calculated in advance. That is, even when the processor 200 estimates a 6-DOF pose of a trackable target with respect to the camera coordinate system, the processor 200 may obtain a 6-DOF pose of the trackable target with respect to the world coordinate system using the transformation matrix.

The pose tracking system 10 may set the camera coordinate system or the world coordinate system to be the reference coordinate system Ow. The processor 200 may estimate a 6-DOF pose of a trackable target by obtaining a matrix $T_z^w$ that indicates a position and an orientation of a coordinate system of the trackable target with respect to the set reference coordinate system Ow.

Figure 4:
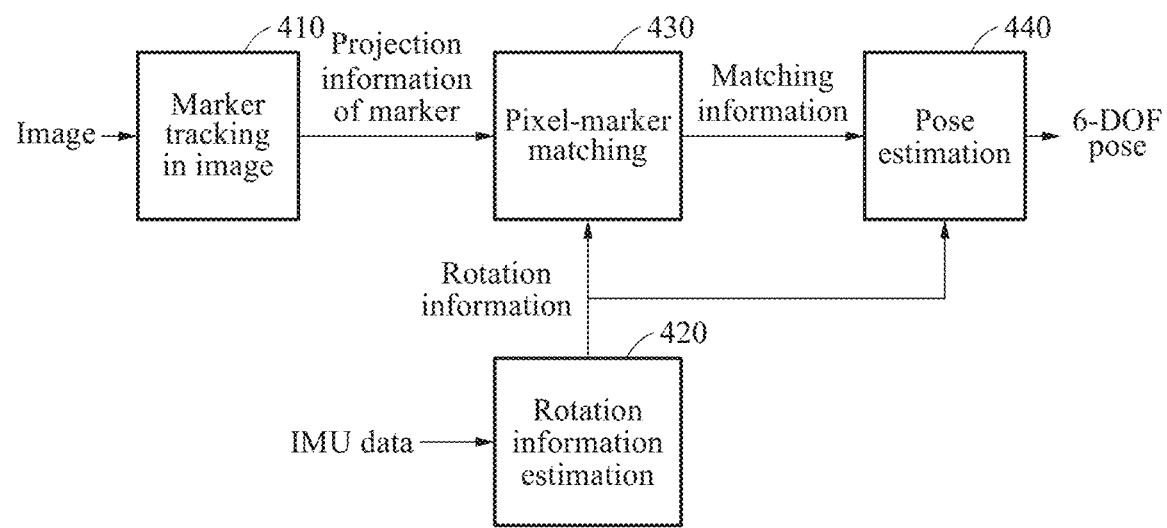
FIG. 4 illustrates an example of an overall operation of the pose tracking apparatus shown in FIG. 1.

FIG. 4 illustrates an example of an overall operation of the pose tracking apparatus 100 shown in FIG. 1.

The processor 200 may obtain an image of a trackable target to which a plurality of markers is attached. The processor 200 may obtain only information of a pixel with periodic changes in brightness change, rather than obtaining information of pixels of an entire image of the trackable target.

In FIG. 4, for example, in operation 410, the processor 200 tracks a pixel corresponding to a marker, for example, the marker 150, in an image of a trackable target. For example, the processor 200 may detect a pixel in the image to which the marker 150, for example, an LED marker periodically blinking, is projected, based on the period of the change in brightness of the pixel.

Hereinafter, for the convenience of description, a pixel to which the marker 150 is projected in a two-dimensional (2D) image captured by the camera 130 will be referred to as a 2D point, and a point at which the marker 150 is disposed in a 3D coordinate system that is set based on the trackable target will be referred to as a 3D point. That is, the 2D point may be a point to which the 3D point is projected in the image captured by the camera 130. The 2D point may also be referred to herein as a first point, and the 3D point may also be referred to herein as a second point.

The 2D point may be detected based on a periodic change in the brightness of a pixel in the image captured by the camera 130. The 3D point may be a point at a position that is set in advance and onto which the marker 150 is attached.

A position of the 2D point may be described based on a coordinate system that is set based on the captured image. A position of the 3D point may be described based on a coordinate system that is set based on the trackable target to which the marker 150 is attached.

In an example, the processor 200 may detect 2D points and obtain a 2D point set, which is a set of coordinates of the 2D points. The processor 200 may obtain a 3D point set, which is a set of coordinates of 3D points, for example, positions in the trackable target to which the marker 150 is attached. For example, the processor 200 may obtain the 3D point set stored in the memory 250.

The processor 200 may obtain IMU data of the trackable target that is measured by the IMU 170. In operation 420, the pose tracking apparatus 100 estimates rotation information of the trackable target based on the IMU data. For example, the processor 200 may estimate the rotation information based on the IMU data through an attitude and heading reference system (AHRS). In this example, the rotation information of the trackable target may include pitch, roll, and yaw that correspond to 3-DOF of the trackable target.

In operation 430, the processor 200 obtains matching pairs by matching a pixel to which each marker is projected in the image captured by the camera 130 to a corresponding marker, using the rotation information of the trackable target. For example, the processor 200 may define a matching pair by matching each 2D point to a corresponding 3D point that is projected to a corresponding 2D point.

In operation 440, the processor 200 estimates a 6-DOF pose of the trackable target based on the matching pairs of 2D points and corresponding 3D points. The processor 200 may improve pose tracking performance by fusing the pose of the trackable target estimated based on the matching pairs with the rotation information.

The processor 200 may continuously track a pose of the trackable target by updating the matching pairs in real-time. For example, in a case in which a reprojection deviation of a matching pair exceeds a threshold value, the processor 200 may cancel a matching relationship of the matching pair, and perform again matching on a 2D point for which the matching relationship is canceled. In addition, the processor 200 may update a matching relationship for a newly detected 2D point in real-time.

Figure 5A:
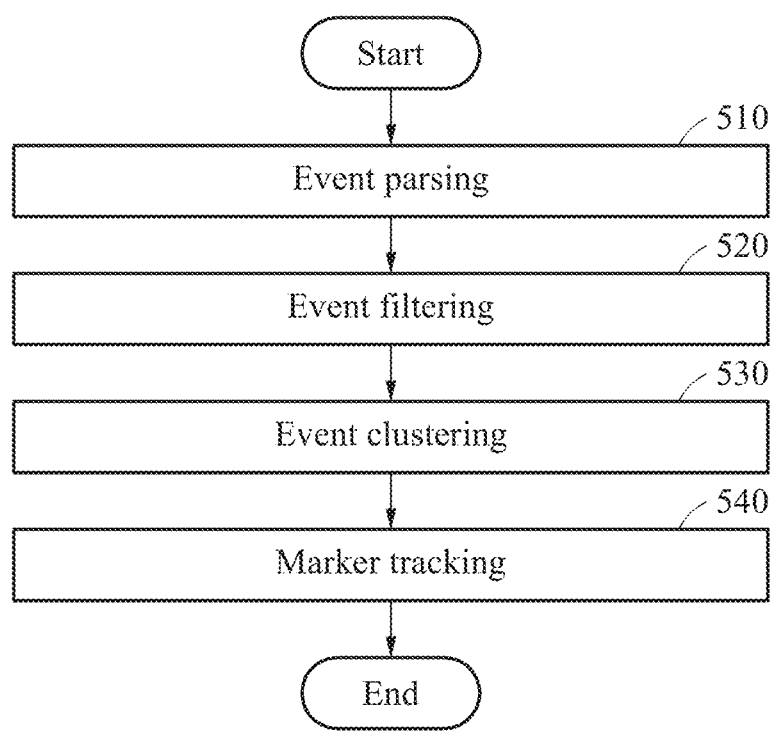
FIG. 5A illustrates a flowchart of an example of tracking a marker by the pose tracking apparatus shown in FIG. 1.
Figure 5B:
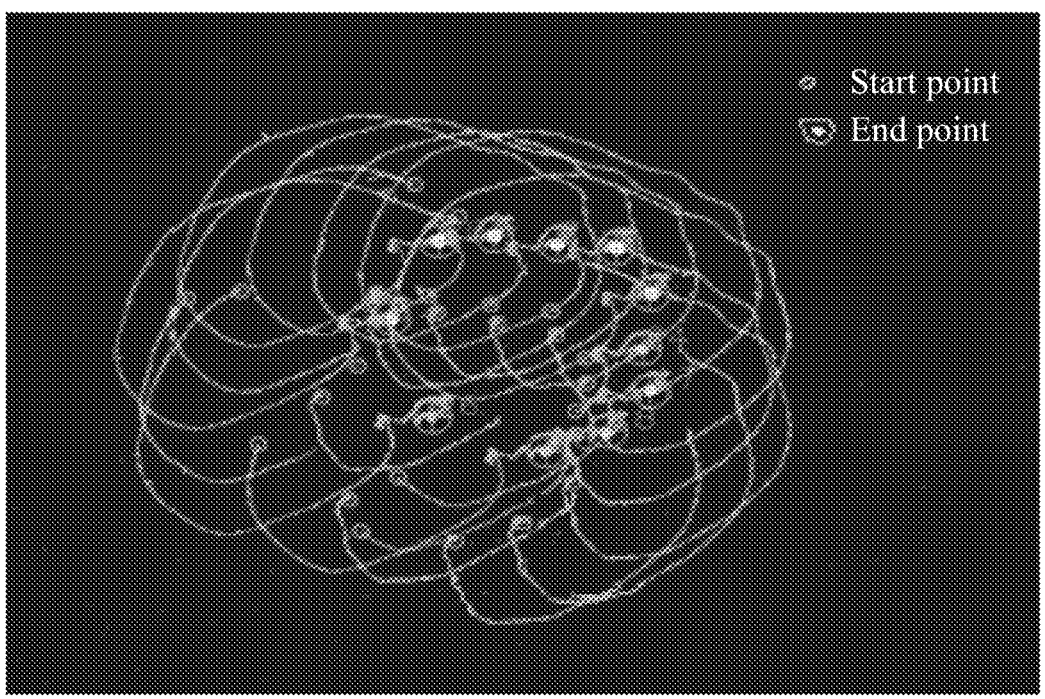
FIG. 5B illustrates an example of a result of tracking a marker.

FIG. 5A illustrates a flowchart of an example of tracking a marker by the pose tracking apparatus 100 shown in FIG. 1. FIG. 5B illustrates an example of a result of tracking a marker.

In FIG. 5A, for example, in operation 510, the processor 200 parses an event occurring in an obtained image. For example, the processor 200 may detect an event that the brightness of a pixel in the image changes.

For example, the processor 200 may generate a tuple corresponding to an event of changing brightness based on pixel information received from a DVS camera 130. The tuple may be indicated as <t, x, y, p>, in which t denotes an event occurrence time (e.g., a time value in a unit of ms), x and y denote coordinates of a pixel corresponding to the event, and p may be 0 or 1 according to a type of the event. In this example, in a case in which the brightness of a pixel positioned at a coordinate (x, y) increases at a time t, the processor 200 may generate a tuple <t, x, y, 1>. In contrast, in a case in which the brightness decreases, the processor 200 may generate a tuple <t, x, y, 0>.

In operation 520, the processor 200 detects a pixel to which a marker, for example, the marker 150, is projected by filtering detected events. For example, the processor 200 may perform the filtering based on whether a brightness change of a pixel corresponds to a preset period. That is, the processor 200 may filter only pixels of which brightness changes periodically.

In operation 530, the processor 200 classifies events obtained through the filtering into different clusters. For example, the processor 200 may classify all pixels obtained through the filtering into a plurality of clusters based on a distance between the pixels. In this example, the processor 200 may classify relatively close pixels into the same cluster. The processor 200 may classify the pixels into the clusters using a region growth-based clustering algorithm and/or a lightweight voting algorithm.

In operation 540, the processor 200 estimates, to be a 2D point that is the pixel to which the marker 150 is projected, a pixel at a position having the highest density in each of the clusters. The processor 200 may continuously track the 2D point by continuously detecting the pixel to which the marker 150 is projected.

The processor 200 may track a plurality of markers by applying a global nearest neighbor (GNN) tracking method and/or a constant speed model-based Kalman filter, thereby reducing a probability of occurrence of an omission or a tracking error.

FIG. 5B illustrates an example of a result of tracking a pixel to which a marker, for example, the marker 150, is projected in a captured image by using the method described above. That is, FIG. 5B is an image showing an example of a movement of a 2D point based on a movement of a trackable target.

Figure 6:
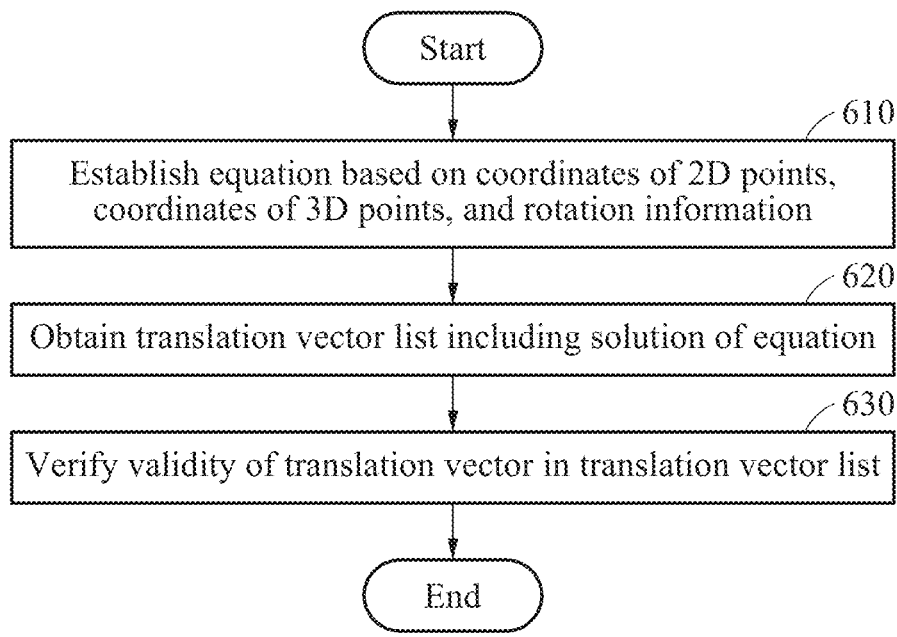
FIG. 6 illustrates a flowchart of an example of marker-pixel matching by the pose tracking apparatus shown in FIG. 1.

FIG. 6 illustrates a flowchart of an example of pixel-marker matching by the pose tracking apparatus 100 shown in FIG. 1.

The processor 200 may obtain a corresponding relationship between a 2D point set and a 3D point set. The processor 200 may match 2D points to corresponding 3D points, and obtain matching pairs. That is, the processor 200 may obtain a matching pair of a 2D point and a 3D point that is projected to the 2D point. Here, the processor 200 may obtain the matching pairs using rotation information of a trackable target.

In FIG. 6, for example, in operation 610, the processor 200 establishes a function of an unknown translation vector ($t=[t_x, t_y, t_z]^T$) based on coordinates ($p_{IA}$ and $p_{IB}$) of two 2D points, coordinates ($p_A$ and $p_B$) of two 3D points, and rotation information ($R=[r_1, r_2, r_3]^T$). For example, the processor 200 may establish an equation such as Equation 2 based on a pinhole imaging principle. In this example, the unknown translation vector ($t=[t_x, t_y, t_z]^T$) may be a vector corresponding to a position of the trackable target, in which $t_x$, $t_y$, and $t_z$ denote displacements in an x-axis direction, a y-axis direction and a z-axis direction, respectively, in a reference coordinate system.

$$p_{IA} = [x_A, y_A, 1]^T = \left[\frac{r_1 p_A + t_x}{r_3 p_A + t_z}, \frac{r_2 p_A + t_y}{r_3 p_A + t_z}, 1\right]^T \quad \text{Equation 2}$$

$$p_{IB} = [x_B, y_B, 1]^T = \left[\frac{r_1 p_B + t_x}{r_3 p_B + t_z}, \frac{r_2 p_B + t_y}{r_3 p_B + t_z}, 1\right]^T$$

In Equation 2, the unknown is a translation vector ($t=[t_x, t_y, t_z]^T$), and thus the number of the unknown is three, and four equations may be obtained. Equation 2 may be represented by Equation 3 below.

$$t = A_z p_{IA} - R p_A \quad \text{Equation 3}$$

$$A_z = \begin{cases} \frac{(r_1 - x_B r_3)(p_A - p_B)}{x_A - x_B}, & x_A \neq x_B \\ \frac{(r_2 - y_B r_3)(p_A - p_B)}{y_A - y_B}, & x_A = x_B \end{cases}$$

The processor 200 may obtain the translation vector ($t=[t_x, t_y, t_z]^T$) by solving the equation represented by Equation 3. The processor 200 may determine whether a 2D point and a 3D point are matched based on the validity of the translation vector ($t=[t_x, t_y, t_z]^T$). For example, in a case in which, at least, one of the elements of the translation vector ($t=[t_x, t_y, t_z]^T$) is greater than or equal to a threshold value, or $t_z$ is a negative value, the processor 200 may determine that the translation vector is not valid.

The processor 200 may randomly select a 2D point and a 3D point, respectively, from the 2D point set and the 3D point set to calculate a translation vector ($t=[t_x, t_y, t_z]^T$). When the translation vector ($t=[t_x, t_y, t_z]^T$) is valid, the processor 200 may match the selected 2D point and the selected 3D point to set them as a matching pair.

In operation 620, the processor 200 obtains a translation vector list, including translation vectors ($t=[t_x, t_y, t_z]^T$) calculated based on randomly selected 2D points and 3D points. In operation 630, the processor 200 verifies the validity of a translation vector in the translation vector list. For example, the processor 200 may delete a translation vector that is not valid among the translation vectors included in the translation vector list and merge translation vectors, each having a difference between elements therein that is less than or equal to a threshold value. The processor 200 may detect a translation vector list including only valid translation vectors, and obtain matching pairs corresponding to the valid translation vectors.

The processor 200 may detect a visible marker that is observable by the camera 130. For example, the processor 200 may detect a visible marker disposed at a first point at which a ray starting from the camera 130 intersects an object based on a Moller-Trumbore ray-triangle intersection algorithm.

The processor 200 may reduce a matching error of matching pairs based on a visible 3D point set corresponding to visible markers, and reduce a calculation amount required for a matching operation and delay time. For example, the processor 200 may perform the matching operation only on the visible 3D point set.

The processor 200 may minimize a matching error in matching the visible 3D point set and the 2D point set using a Hungarian algorithm or a Kuhn-Munkres algorithm. For example, the processor 200 may calculate a matching error of the translation vector list, including the valid translation vectors, detect a translation vector that minimizes the matching error, and obtain a correct matching pair.

Figure 7:
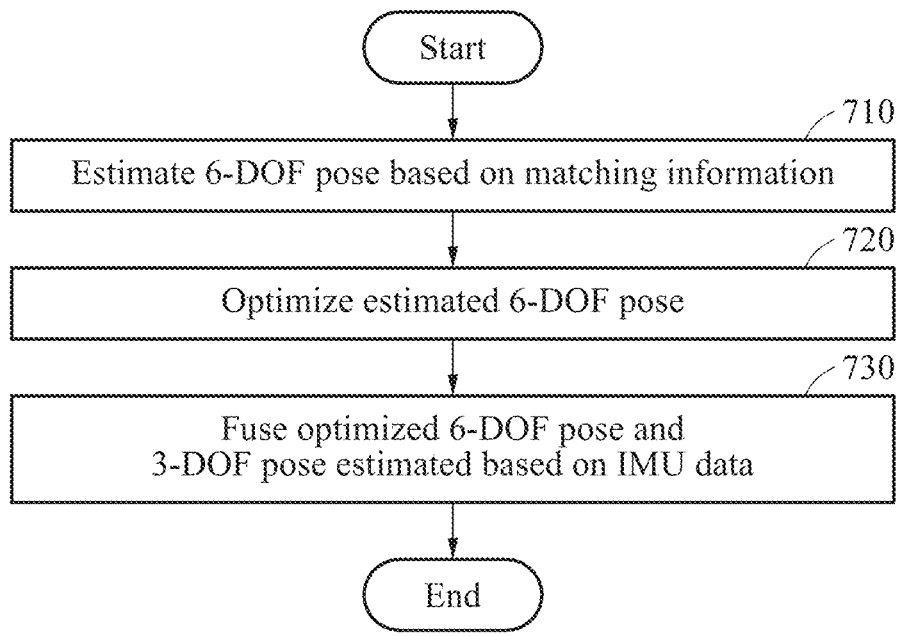
FIG. 7 illustrates a flowchart of an example of a pose tracking method to be performed by the pose tracking apparatus shown in FIG. 1.

FIG. 7 illustrates a flowchart of an example of a pose tracking method performed by the pose tracking apparatus 100 shown in FIG. 1.

In FIG. 7, for example, in operation 710, the processor 200 estimates a 6-DOF pose of a trackable target based on matching pairs. For example, the processor 200 may estimate the 6-DOF pose using a perspective-n-point (PnP) algorithm. The PnP algorithm may include an effective PnP (EPnP) algorithm.

The processor 200 may calculate a reprojection deviation for each of the matching pairs. The processor 200 may then remove a matching pair of which a reprojection deviation exceeds a threshold value, and estimate the 6-DOF pose of the trackable target based on remaining matching pairs among the matching pairs. For example, the processor 200 may remove the matching pair of which the reprojection deviation exceeds the threshold value through a random sample consensus (RANSAC) algorithm.

In operation 720, the processor 200 optimizes the estimated 6-DOF pose of the trackable target. For example, the processor 200 may optimize the estimated 6-DOF pose using a bundle adjustment (BA) algorithm, thereby obtaining a more accurate pose.

The processor 200 may re-match a 2D point and/or 3D point of which a matching relationship is canceled as the reprojection deviation exceeds the threshold value based on the optimized pose, and then detect a matching relationship of a newly observed 2D point.

In operation 730, the processor 200 fuses 3-DOF rotation information estimated based on IMU measurement data with the optimized pose. For example, the processor 200 may fuse the 6-DOF pose estimated based on the matching pairs and the 3-DOF pose estimated based on the IMU measurement data, using a sensor fusion algorithm of an extended Kalman filter (EKF), thereby estimating a pose of the trackable target with improved performance.

The processor 200 may update a matching relationship based on the fused 6-DOF pose and obtain a matching relationship of a newly observed 2D point, thereby continuously tracking a pose of the trackable target.

The pose tracking apparatus 100, camera 130, marker 150, IMU 170, pose tracking apparatus, and other apparatuses, devices, units, modules, and components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A pose tracking method, comprising:
   obtaining an image of a trackable target having a plurality of markers;
   detecting first points in the obtained image to which the markers are projected;
   matching the first points to second points, corresponding to positions of the markers in a coordinate system set based on the trackable target, based on rotation information of the trackable target; and
   estimating a pose of the trackable target based on matching pairs of the first points and the second points.

2. The pose tracking method of claim 1, wherein the obtaining comprises obtaining only information of pixels in the image that periodically change.

3. The pose tracking method of claim 1, wherein the detecting comprises:
   obtaining pixels in the image that periodically change by filtering based on a characteristic of the change;
   classifying the obtained pixels into different clusters based on respective positions of the pixels; and
   detecting, as the first points, pixels at positions having greatest densities in the clusters.

4. The pose tracking method of claim 1, wherein the matching comprises:
   establishing a translation vector based on one or more functions of coordinates of the first points, coordinates of the second points, and the rotation information;
   obtaining a translation vector list comprising solutions of the one or more functions; and
   matching the first points and the second points based on the obtained translation vector list.

5. The pose tracking method of claim 4, wherein the matching based on the translation vector list comprises:
   determining validity of translation vectors included in the translation vector list; and
   matching the first points and the second points based on a result of the determining of the validity of the translation vectors.

6. The pose tracking method of claim 5, wherein the determining of the validity comprises:
   determining whether at least one of elements of a translation vector exceeds a threshold value; and
   determining whether an element of the translation vector is a negative value.

7. The pose tracking method of claim 1, wherein the matching comprises:
   detecting, among the markers, a visible marker observable by a camera capturing the image; and
   matching the first points and the second points based on the detected visible marker.

8. The pose tracking method of claim 1, further comprising:
   discarding a matching pair, among the matching pairs, of which a reprojection deviation exceeds a preset threshold value; and
   updating the matching pairs based on a newly observed marker in the image.

9. The pose tracking method of claim 1, wherein the estimating comprises fusing the pose estimated, based on the matching pairs, and the rotation information.

10. A non-transitory computer-readable storage medium storing instructions that, when executed by a processor, cause the processor to perform the pose tracking method of claim 1.

11. A pose tracking apparatus, comprising:
    one or more processors configured to:
    obtain an image of a trackable target having a plurality of markers;
    detect first points in the obtained image to which the markers are projected;
    match the first points to second points corresponding to positions of the markers in a coordinate system set based on the trackable target, based on rotation information of the trackable target; and
    estimate a pose of the trackable target based on matching pairs of the first points and the second points.

12. The pose tracking apparatus of claim 11, wherein the one or more processors are further configured to obtain only information of pixels in the image that periodically change.

13. The pose tracking apparatus of claim 11, wherein the one or more processors are further configured to:
    obtain pixels in the image that periodically change by filtering based on a characteristic of the change;
    classify the obtained pixels into different clusters based on positions of the pixels; and
    detect, as the first points, pixels at positions having greatest densities in the clusters.

14. The pose tracking apparatus of claim 11, wherein the one or more processors are further configured to:
    establish a translation vector based on one or more functions of coordinates of the first points, coordinates of the second points, and the rotation information;
    obtain a translation vector list comprising solutions of the one or more functions; and
    match the first points and the second points based on the obtained translation vector list.

15. The pose tracking apparatus of claim 14, wherein the one or more processors are further configured to:
    determine validity of translation vectors included in the translation vector list; and
    match the first points and the second points based on a result of the determining of the validity of the translation vectors.

16. The pose tracking apparatus of claim 15, wherein the one or more processors are further configured to:
    determine whether at least one of elements of a translation vector exceeds a threshold value; and
    determine whether an element of the translation vector is a negative value.

17. The pose tracking apparatus of claim 11, wherein the one or more processors are further configured to:
    detect, among the markers, a visible marker observable by a camera capturing the image; and
    match the first points and the second points based on the detected visible marker.

18. The pose tracking apparatus of claim 11, wherein the one or more processors are further configured to:
    discard a matching pair, among the matching pairs, of which a reprojection deviation exceeds a preset threshold value; and
    update the matching pairs based on a newly observed marker in the image.

19. The pose tracking apparatus of claim 11, wherein the one or more processors are further configured to fuse the pose estimated ,based on the matching pairs, and the rotation information.

20. The pose tracking apparatus of claim 11, further comprising:
    an image capturing device configured to capture the image; and
    a sensor configured to sense the rotation information.

* * * * *